2 Sheets—Sheet 1.

C. BRYANT.
Circular Sawing Machine.

No. 230,175.  Patented July 20, 1880.

Witnesses:
Hiram Blake
Ira W. Russell

Inventor:
Calvin Bryant

2 Sheets—Sheet 2.

C. BRYANT.
Circular Sawing Machine.

No. 230,175. Patented July 20, 1880.

Witnesses:
Hiram Blake,
Ira W Russell

Inventor:
Calvin Bryant

UNITED STATES PATENT OFFICE.

CALVIN BRYANT, OF KEENE, NEW HAMPSHIRE.

CIRCULAR SAWING MACHINE.

SPECIFICATION forming part of Letters Patent No. 230,175, dated July 20, 1880.

Application filed January 22, 1880.

*To all whom it may concern:*

Be it known that I, CALVIN BRYANT, of Keene, in the county of Cheshire and State of New Hampshire, have invented certain new and useful Improvements in Circular Sawing Machines; and I do hereby declare that the following is a full, clear, and exact description of the invention, which will enable others skilled in the art to which it appertains to make and use the same, reference being had to the accompanying drawings, and to the letters of reference marked thereon, which form a part of this specification, in which—

Figure 1:
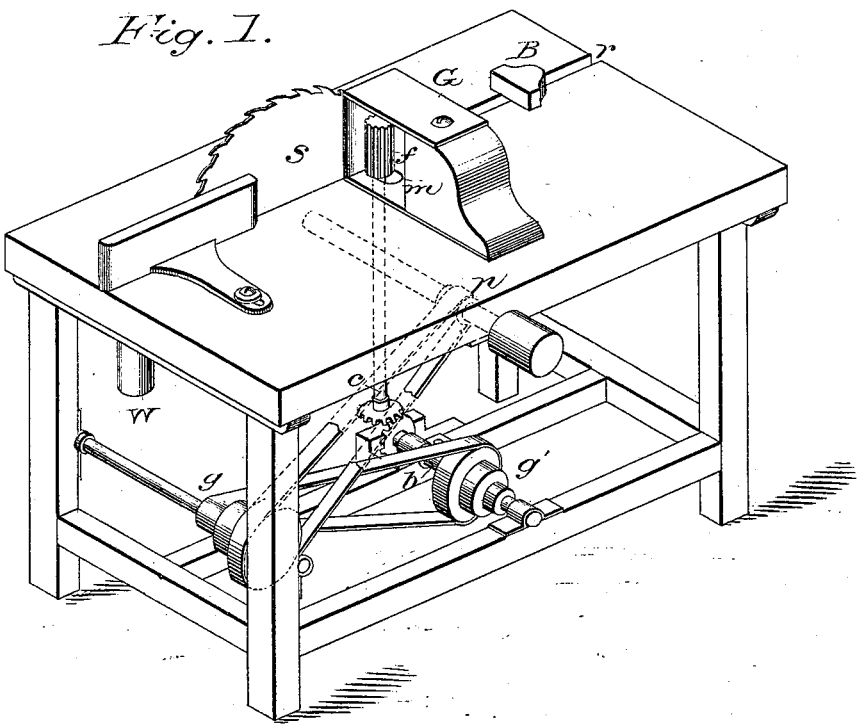
Figure 3:
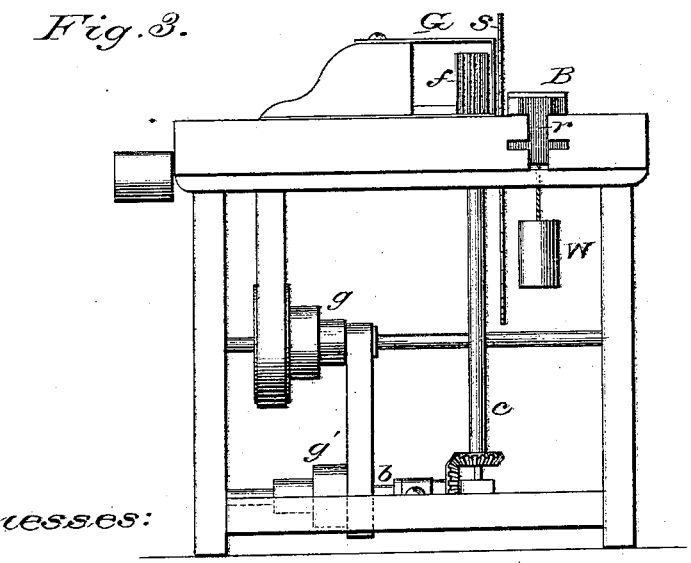
Figure 2:
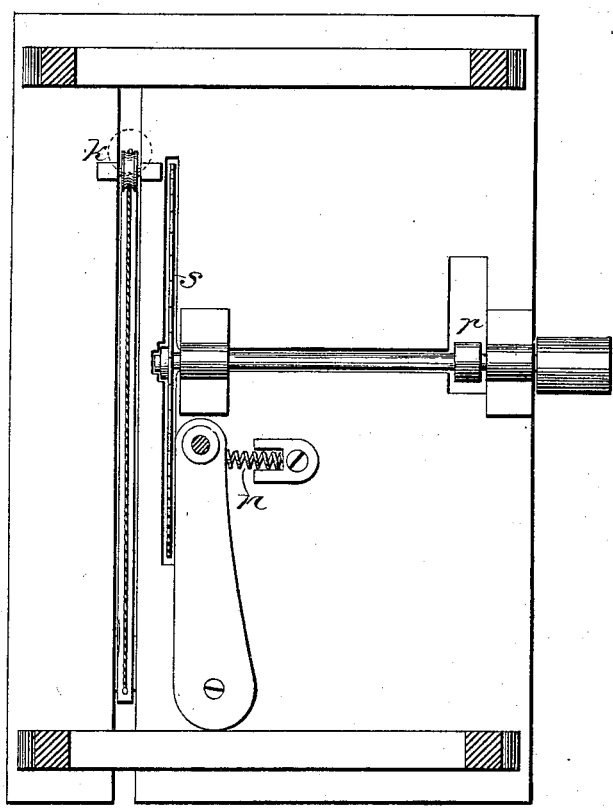

Figure 1 is a perspective view of my invention. Fig. 2 is a top view, and Fig. 3 is an end elevation.

The object of my invention is to provide a machine, which is partially self-working, for rapidly and easily sawing boards, laths, sieve-hoops, or any light lumber; and it consists of an ordinary circular saw mounted on a frame in the usual manner, upon which frame is attached an apparatus operated by belts and gearing connected with the arbor of the saw, whereby the lumber in the process of sawing is caught by a feed-roller and drawn through or past the saw; after which the unsawed lumber is returned to its position in front of the saw, where the operation is again repeated.

The various working parts of the machine are described as follows: On the saw-arbor is placed a pulley, $p$, which is connected by a belt to the graduated or cone pulley, $g$. This pulley is also connected by a belt to the graduated pulley $g'$. The arbor of the pulley $g'$ is connected, by a bevel-gearing, $b$, to a perpendicular counter-shaft, $c$, which extends above the saw-bench next the face of the saw S.

On the upper end of the upright shaft C is an upright fluted feed-pulley, $f$, which, with other appliances, draws the lumber through or past the saw.

On the top of the saw-bench, and against the saw S, is placed a guide or griper, G. This griper is constructed of a thin band of metal affixed to a block, and passes over the feed-pulley $f$; thence downward, flatwise against the face of the saw, and between the saw and feed-pulley $f$. The front edge of the griper next the saw is sharpened, so that the board, while being sawed, will pass without obstruction between the griper and feed-pulley, and thus be drawn through or past the saw.

The upper end of the shaft C, next the feed-pulley $f$, runs in a swinging or movable bearing, $m$, and by aid of a spring, $n$, the feed-roller is forced against the saw or griper, thus accommodating boards of different thickness.

The movable bearing and spring may be constructed in any convenient manner to accomplish the desired result.

The speed of the feed-pulley $f$ is regulated as desired by shifting the belt on the graduated pulleys $g$ and $g'$.

When the feed-pulley has accomplished its work, by drawing the block of lumber past the saw the portion of the block unsawed is returned to the front of the saw by a movable block or carriage, B, which moves backward and forward in a grooved track in the bench in a line with the face of the saw, and is constructed in the following manner: A groove, $r$, is cut through the bench from the rear end, of the desired length, in a line with and a short space from the face of the saw.

On the upper surface of the bench the carriage is enlarged, so as to extend above the bench and also against the face of the saw. The carriage also extends through the bench-plank and runs in the groove $r$. The under part of the carriage is connected by a cord extending under and to the front part of the bench, and running over a pulley or bearing, $k$. On the end of the cord a weight, W, is attached, which draws the carriage to the front end of the groove.

In the process of sawing, while the feed-roller $f$ is drawing the lumber past the saw on one side the portion of the unsawed block is pushing the carriage B to the rear end of the bench, and when the board is sawed the carriage B, being propelled by the weight W, pushes the unsawed lumber back to its former position in the front of the saw, where it is again started by hand, until the end of the board is caught by the feed-roller $f$, when the same operation is repeated.

I claim as my invention—

The combination, in a sawing-machine, of the griper G, when constructed as described, with the adjustable feed-roller $f$, substantially as set forth.

In testimony that I claim the foregoing as my own I affix my signature in presence of two witnesses.

CALVIN BRYANT.

Witnesses:
H. A. WOODWARD,
HIRAM BLAKE.